United States Patent [19]

Irisawa

[11] Patent Number: 4,548,910
[45] Date of Patent: Oct. 22, 1985

[54] DIELECTRIC CERAMIC OF BAO-TIO$_2$ AND SNO$_2$

[75] Inventor: Naoshi Irisawa, Akita, Japan

[73] Assignee: TDK Electronics Co., Ltd., Tokyo, Japan

[21] Appl. No.: 680,127

[22] Filed: Dec. 10, 1984

Related U.S. Application Data

[63] Continuation-in-part of Ser. No. 428,709, Sep. 30, 1982, abandoned.

[30] Foreign Application Priority Data

Oct. 28, 1981 [JP] Japan ................. 56-172481

[51] Int. Cl.$^4$ ............................. C04B 35/46
[52] U.S. Cl. .................. 501/137; 333/204; 361/322
[58] Field of Search ..................... 501/137

[56] References Cited

U.S. PATENT DOCUMENTS

| | | | |
|---|---|---|---|
| 3,938,064 | 2/1976 | O'Bryan et al. | 501/137 |
| 4,337,446 | 6/1982 | O'Bryan et al. | 423/598 |
| 4,338,403 | 7/1982 | Kawashima et al. | 501/137 |
| 4,353,047 | 10/1982 | Noguchi et al. | 501/137 |

OTHER PUBLICATIONS

O'Bryan, H. M. et al., J. Am Cer Soc., Discussions and Notes, Oct. 1974, pp. 450-453.
Jonker, G. H. et al., "The Ternary Systems BaO-TiO$_2$-SnO$_2$ and BaO-TiO$_2$-ZrO$_2$" J. Amer. Cer. Soc. 41, (1958) pp. 390-394.

Primary Examiner—Helen M. McCarthy
Attorney, Agent, or Firm—Armstrong, Nikaido, Marmelstein & Kubovcik

[57] ABSTRACT

The components, of a microwave circuit, such as a filter, and a solid oscillator, etc. consists of a dielectric ceramic composition. A known BaO-TiO$_2$ compound exhibits properties which make it suitable for use as the components of a microwave circuit but the resonance frequency linearity and the resonance frequency temperature coefficient are not excellent. The dielectric ceramic composition of the present invention is expressed by the formula of BaO.x{(1−y)TiO$_2$.ySnO$_2$}, wherein x is 4.4 moles and y is from 0.06 to 0.09 mole, and has a mixed crystal structure of Ba(Ti.Sn)$_4$O$_9$ and Ba$_2$(Ti.Sn)$_9$O$_{20}$.

3 Claims, 6 Drawing Figures

Fig. IA
Fig. IB
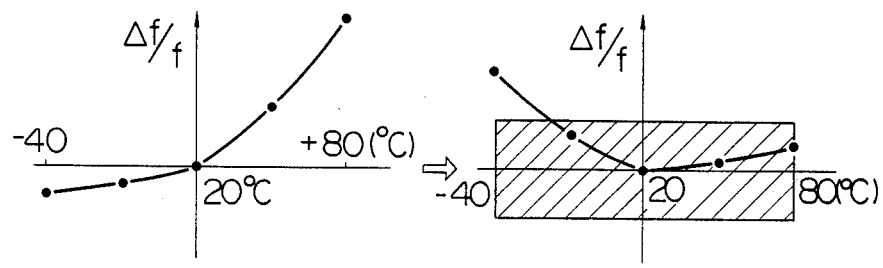
Fig. IC
Fig. ID
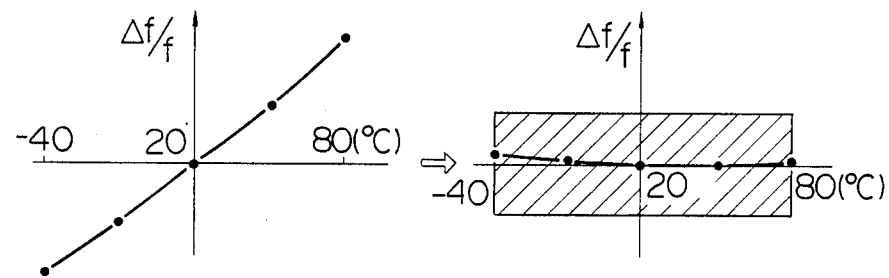

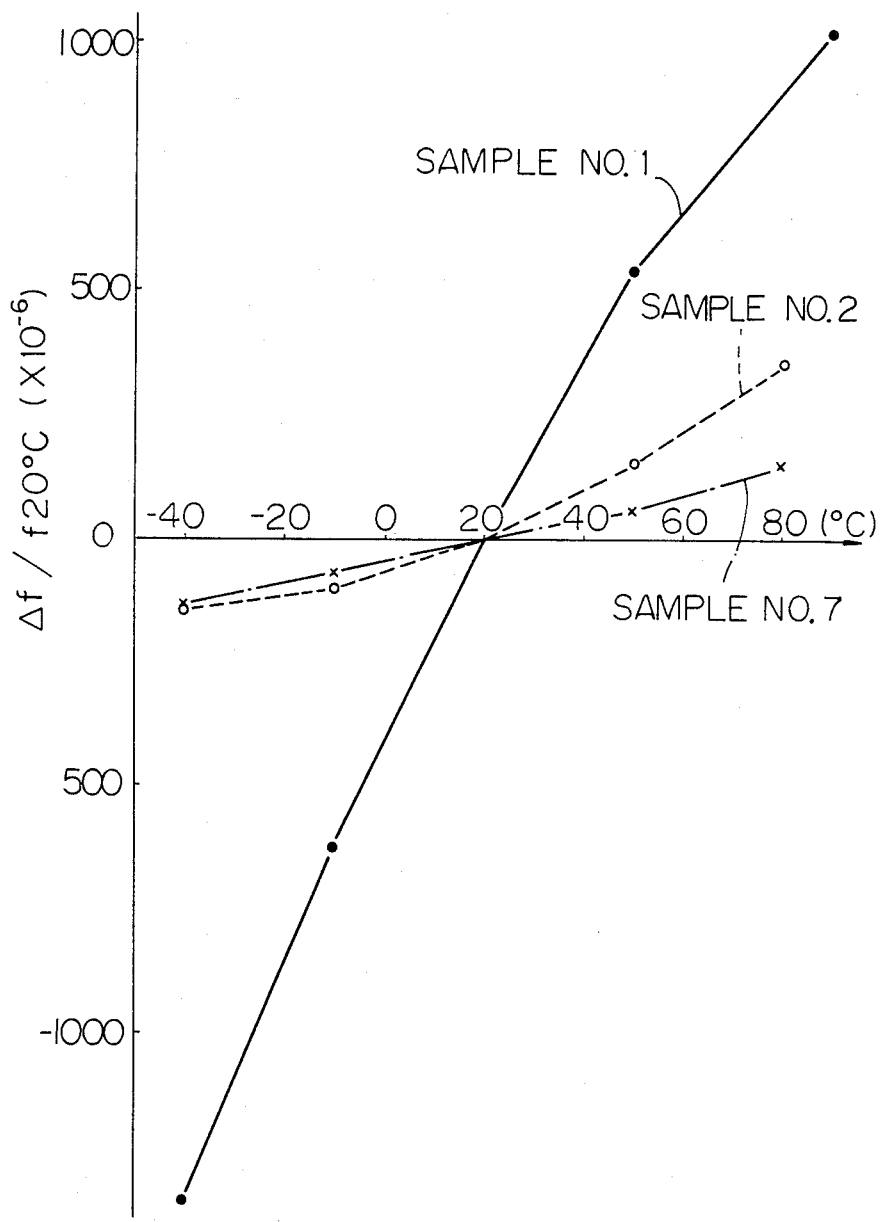

DIELECTRIC CERAMIC OF BAO-TIO$_2$ AND SNO$_2$

This application is a continuation-in-part of prior parent application U.S. Ser. No. 428,709, filed Sept. 30, 1982, now abandoned.

The present invention relates to a dielectric ceramic composition. More particularly, it relates to a dielectric ceramic composition used at a high frequency or used as a temperature-composition ceramic capacitor.

Dielectric ceramics are used as various components of a microwave circuit, e.g., as a miniaturized filter, a solid oscillator having a stable oscillation frequency, a capacitor, and an impedance-matching component. Dielectric ceramics used for a microwave circuit should exhibit a satisfactorily high dielectric constant ($\epsilon$), a high unloaded Q, a small resonance frequency-temperature coefficient and a good linearity of temperature characteristics at a high frequency. The symbol Q indicates 1/tan $\delta$, wherein tan $\delta$ is the dielectric loss tangent.

The *Journal of the American Ceramic Society—Discussions and Notes,* Oct. 1974, pp 450–453 reports that a BaO-TiO$_2$ compound exhibits a thermally stable high dielectric constant ($\epsilon$), a high no unloaded Q, and a small dielectric constant coefficient ($\tau$k).

Dielectric ceramics consisting of a BaO-TiO$_2$ compound have, however, a rather poor resonance frequency linearity depending upon the temperature. In addition, the properties of such dielectric ceramics, especially the resonance frequency temperature coefficient, are liable to be unstable depending upon the production conditions. It is, therefore, difficult by using dielectric ceramics to provide a microwave circuit having a stable frequency characteristics, for example, a local oscillator having a stable oscillation frequency.

It is an object of the present invention to provide a dielectric ceramic composition in which the linearity of the resonance frequency and the resonance frequency temperature coefficient are improved over those of the known ceramic dielectric composition consisting of BaO and TiO$_2$.

In accordance with the present invention, there is provided a dielectric ceramic composition which is characterized by consisting of three components, namely BaO, TiO$_2$, and SnO$_2$, being expressed by the formula BaO.x{(1−y)TiO$_2$.ySnO$_2$}, wherein x is 4.4 mole, and y is from 0.06 to 0.09, and having a mixed crystal structure of Ba(Ti.Sn)$_4$O$_9$ and Ba$_2$(Ti.Sn)$_9$)$_{20}$, said dielectric ceramic composition having a resonance frequency coefficient at a temperature of −40° to 80° C. in the range of +3 ppm/°C. to 0 ppm/°C. and a nearly linear resonance frequency temperature characteristic.

The present invention is now explained with reference to drawings.

BRIEF EXPLANATION OF DRAWINGS

FIG. 1 A illustrates bad linearity and the temperature characteristic of resonance frequency with regard to the dielectric material.

FIG. 1B illustrates bad temperature characteristic of an oscillator using the dielectric material of FIG. 1A.

FIG. 1C illustrates good linearity and the temperature characteristic of resonance frequency with regard to the dielectric material.

FIG. 1D illustrates temperature characteristic of an oscillator using the dielectric material of FIG. 1C.

FIGS. 2 and 3 are graphs showing the temperature resonance frequency coefficient Tcf of the samples.

Figure 3:
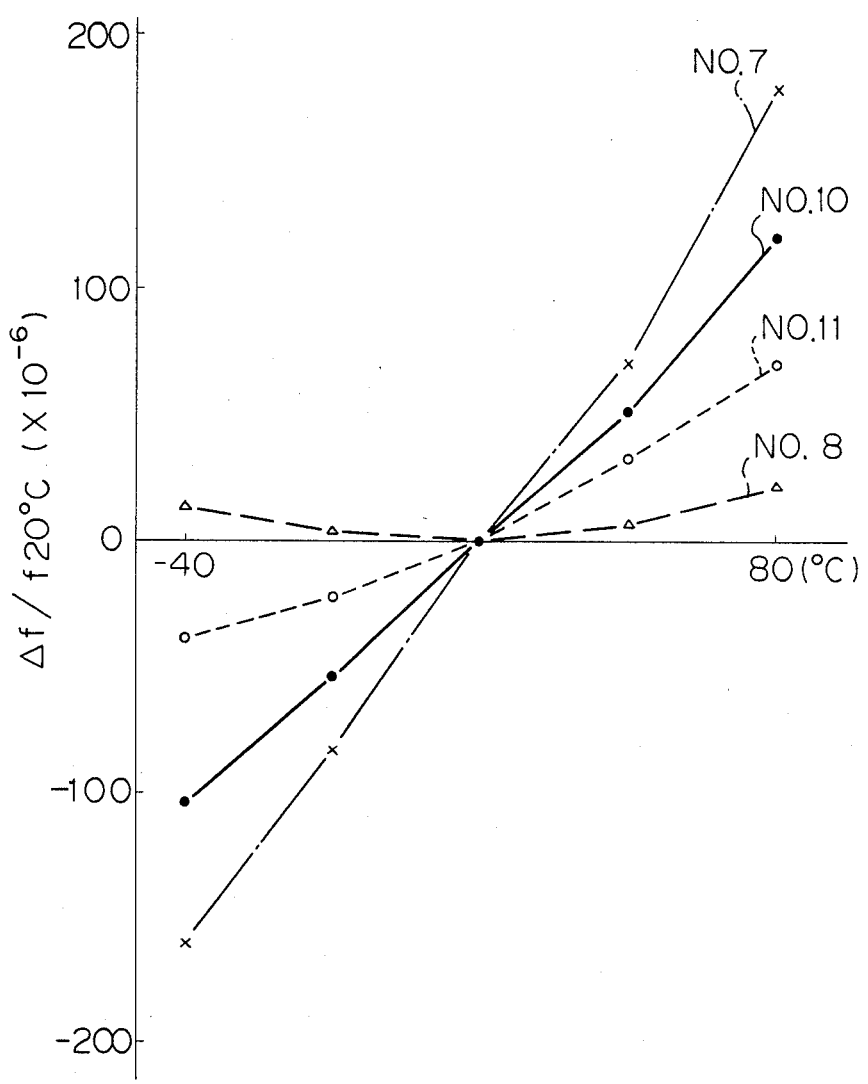

The ceramic dielectric composition of the present invention is appropriate for a miniaturized filter, a solid oscillator, an impedance matching component and other components of a microwave circuit, for example, 300 MHz–30 GHz, because they exhibit a high dielectric constant, a high unloaded Q, a small-temperature resonance frequency coefficient, and a high linearity of the resonance frequency temperature characteristic.

When dielectric material exhibiting a bad resonance frequency temperature characteristic as shown in FIG. 1A is used for an oscillator, the resonance frequency temperature characteristic of the oscillator varies outside the hatched range of an industrial standard at a low temperature side, as shown in FIG. 1B.

When dielectric material exhibiting a good resonance frequency temperature coefficient as shown in FIG. 1C is used for an oscillator, the resonance frequency temperature coefficient of the oscillator varies within the hatched range of an industrial standard at a low temperature side, as shown in FIG. 1D.

In addition, by means of controlling the Sn amount (y), it is possible to optionally adjust the resonance frequency temperature coefficient with a good reproducibility. Therefore, in a microwave circuit in which the dielectric ceramic composition of the present invention is used as a component, the coefficient of this component easy compensates for the resonance frequency temperature coefficient of another component which consists of BaO-TiO$_2$ dielectric ceramic composition.

The dielectric ceramic composition of the present invention is also appropriate for use as a capacitor.

According to an embodiment of the present invention attaining a very low-temperature resonance frequency coefficient Tcf, x is approximately 4.4 moles and y is approximately 0.09 mole.

According to an embodiment of the present invention attaining a particularly high linearity of the resonance frequency temperature characteristic, x is approximately 4.4 moles and y is approximately 0.06 mole.

Commercially available barium carbonate (BaCO$_3$), titanium oxide (TiO$_2$), and tin oxide (SnO$_2$) as raw materials were weighed so as to provide a BaO.x{(1−y)TiO$_2$.ySnO$_2$} composition, the x and y values of which are given in the table below. The raw materials were wet-mixed in a ball mill for 20 hours. The wet-mixed raw materials were dehydrated, calcined and preliminarily shaped by pressing them at a pressure of 0.5 t/cm$^2$. The preliminarily shaped bodies were calcined at a temperature of from 1050° C. to 1200° C. for 2 hours and then the calcined bodies were water-ground. The resultant powder was dehydrated and calcined, followed by granulation with an appropriate amount of a binder. The resultant grains were shaped to form discs having a diameter of 13 mm and height of 7 mm. The discs were sintered at a temperature of from 1250° C. to 1370° C. for 2 hours. The resultant dielectric ceramic compositions in the form of a disc were machined and samples having a diameter of 10 mm and a height of 5 mm were obtained. The dielectric constant ($\epsilon$) and unloaded Q at 7 GHz, as well as the resonance frequency temperature coefficient Tcf, of the samples were measured. In the measurement of the resonance frequency temperature coefficient, the resonance frequency of the samples was measured at a temperature ranging from −40° C. to +80° C., and the variance ($\Delta$f) of the resonance frequency in the range of from −40° C. to 80° C. was calculated. And these values were measured by the following method. The samples were sandwiched between a pair of metal plates at the top and bottom surfaces so as to produce a dielectric resonator. The dielectric constant ($\epsilon$), the unloaded Q, and the resonance frequency temperature coefficient Tcf were measured when the resonator was in the $TE_{01l}$ mode. The results of measurement are given in the table.

TABLE

| Sample No. | x | y | Dielectric Constant ($\epsilon$) | Unloaded | Tcf (ppm/°C.) (−40 ∼ 80° C.) |
|---|---|---|---|---|---|
| *1  | 4.0 | 0    | 36 | 8,500 | +20 |
| *2  | 4.5 | 0    | 39 | 6,600 | +4  |
| *3  | 4.5 | 0.06 | 36 | 5,500 | −2  |
| *4  | 4.3 | 0.03 | 37 | 7,200 | +7  |
| 5   | 4.4 | 0.03 | 38 | 6,900 | +4  |
| *6  | 4.3 | 0.06 | 36 | 6,300 | +5  |
| 7   | 4.4 | 0.06 | 36 | 6,400 | +3  |
| 8   | 4.4 | 0.09 | 35 | 5,500 | 0   |
| *9  | 4.3 | 0.10 | 34 | 3,600 | +21 |
| 10  | 4.4 | 0.07 | 36 | 6,000 | +2  |
| 11  | 4.4 | 0.08 | 35 | 5,800 | +1  |

In the table, the composition of the asterisked samples is outside the present invention. As is apparent from the table, when x is 4 moles, the resonance frequency temperature coefficient Tcf is +20 ppm/°C. and is very high. On the other hand, when x is 4.5 moles, the unloaded Q is relatively low. When y is 0.1 mole, the dielectric constant ($\epsilon$) and the unloaded Q are very low. The replacement of titanium with 0.1 mole of tin is, therefore, disadvantageous for stabilizing the electric properties and decreasing Tcf.

Samples 2 and 3 having an x of 4.5 moles had a poor sintering property.

Both $Ba(Ti.Sn)_4O_9$ and $Ba_2(Ti.Sn)_9O_{20}$ were detected in samples having an x greater than 4 moles but less than 4.5 moles.

FIGS. 2 and 3 are graphs illustrating $\Delta f/f_{20°}$ C. ($\times 10^{-6}$) of the samples 1, 2, 7, 8, 10, and 11.

The tendency of the $\Delta f/f(20°$ C.) curve to bend at a temperature higher and lower than the critical high and low temperature, i.e., approximately +50° C. and −10° C., respectively, hereinafter referred to as the resonance frequency temperature variation of, Sample 1, i.e., a $BaTi_4O_9$ compound, is opposite to that of Sample 2.

In the experiments carried out by the present inventors, the resonance frequency temperature variation of $Ba(Ti.Sn)_4O_9$ had the same tendency as $BaTi_4O_9$ while the resonance frequency temperature variation of $Ba_2(Ti.Sn)_9O_{20}$ had the same tendency as Sample 2, i.e., $Ba_2Ti_9O_2$.

Since the dielectric ceramic composition of the present invention, i.e., Samples 5, 7, 8, 10 and 11, has a mixed crystal structure of $Ba(Ti.Sn\ 4O_9)$ and $Ba_2(Ti.Sn)_9O_{20}$, the resonance frequency temperature variation of $Ba(Ti.Sn)_4O_9$ and that of $Ba_2(Ti.Sn)_9O_{20}$ offset each other, with the result that the linearity of the resonance frequency temperature characteristic is enhanced. In addition, it is possible to control Tcf at 0, +1, +2, and +3 ppm/°C. by adjusting the Sn amount (y) at 0.09, 0.08, 0.07 and 0.06 mole.

I claim:

1. A dielectric ceramic composition consisting of three components, namely, BaO, $TiO_2$, and $SnO_2$, being expressed by the formula $BaO.x\{(1-y)TiO_2.ySnO_2\}$, wherein x is 4.4 mole, and y is from 0.06 to 0.09, and having a mixed crystal structure of $Ba(Ti.Sn)_4O_9$ and $Ba_2(Ti.Sn)_9O_{20}$, said dielectric ceramic composition having a resonance frequency coefficient at a temperature of −40° to 80° C. in the range of +3 ppm/°C. to 0 ppm/°C. and a nearly linear resonance frequency temperature characteristic.

2. A component of a microwave circuit of from 300 MHz to 30 GHz comprising said dielectric ceramic composition of claim 1.

3. A temperature-compensation ceramic capacitor comprising said dielectric composition of claim 1.

* * * * *